(12) United States Patent
Saito et al.

(10) Patent No.: US 11,289,912 B2
(45) Date of Patent: Mar. 29, 2022

(54) MANAGEMENT SYSTEM, NON-TRANSITORY COMPUTER READABLE MEDIUM, MANAGEMENT METHOD, AND MANAGEMENT SERVER

(71) Applicant: HONDA MOTOR CO.,LTD., Tokyo (JP)

(72) Inventors: Hidekazu Saito, Saitama (JP); Ken Hanayama, Saitama (JP); Kanako Ikeda, Tokyo (JP); Daijiro Takizawa, Saitama (JP); Keiichi Iguchi, Tokyo (JP); Shigeaki Esaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/979,524

(22) PCT Filed: Mar. 20, 2019

(86) PCT No.: PCT/JP2019/011763
§ 371 (c)(1),
(2) Date: Sep. 10, 2020

(87) PCT Pub. No.: WO2019/182027
PCT Pub. Date: Sep. 26, 2019

(65) Prior Publication Data
US 2021/0249863 A1    Aug. 12, 2021

(30) Foreign Application Priority Data

Mar. 20, 2018 (JP) .............................. JP2018-052846

(51) Int. Cl.
*G06F 1/14* (2006.01)
*H02J 3/28* (2006.01)

(52) U.S. Cl.
CPC . *H02J 3/28* (2013.01); *G06F 1/14* (2013.01)

(58) Field of Classification Search
CPC ..................................... H02J 3/28; G06F 1/14
(Continued)

(56) References Cited

U.S. PATENT DOCUMENTS

2015/0298630 A1* 10/2015 Iwai ........................ B60R 25/30
320/135
2018/0210032 A1* 7/2018 Fujii ..................... G01R 31/389

FOREIGN PATENT DOCUMENTS

| JP | 2003007348 A | 1/2003 |
|----|--------------|--------|
| JP | 2003229160 A | 8/2003 |
| JP | 2017130417 A | 7/2017 |

OTHER PUBLICATIONS (ISA/237) Written Opinion of the International Search Authority for International Patent Application No. PCT/JP2019/011763, mailed by the Japan Patent Office dated Jun. 4, 2019.
(Continued)

*Primary Examiner* — Robert A Cassity

(57) ABSTRACT

Provided is a consideration decision unit configured to decide, when the portable energy storage equipment transferred from one body to another body as a first transfer at a first timing is transferred to the other body or still another body which is different from the other body to the one body as a second transfer at a second timing, a consideration for the second transfer of the portable energy storage equipment at the second timing based on at least one of (i) a length of a period from the first timing to the second timing and (ii) a deterioration state of the portable energy storage equipment at the second timing.

2 Claims, 7 Drawing Sheets

(58) Field of Classification Search
USPC .......................................................... 700/295
See application file for complete search history.

(56) References Cited

OTHER PUBLICATIONS

Office Action issued for counterpart Japanese Application No. 2020-507878, issued by the Japanese Patent Office dated Jul. 7, 2020 (drafted on Jul. 3, 2020).
Decision to Grant a Patent issued for counterpart Japanese Application No. 2020-507878, issued by the Japanese Patent Office dated Aug. 4, 2020 (drafted on Jul. 29, 2020).

* cited by examiner

MANAGEMENT SYSTEM, NON-TRANSITORY COMPUTER READABLE MEDIUM, MANAGEMENT METHOD, AND MANAGEMENT SERVER

CROSS-REFERENCE TO RELATED APPLICATIONS

This application is a National Stage Entry of International Application No. PCT/JP2019/011763, filed on Mar. 20, 2019, which claims priority to Japanese Patent Application No. 2018-052846 filed in JP, filed on Mar. 20, 2018, the contents of each of which are hereby incorporated by reference in their entirety.

BACKGROUND

1. Technical Field

The present invention relates to a management system, a non-transitory computer readable medium, a management method, and a management server.

2. Related Art

A mobile type or portable type fuel cell system is sold to a consumer in some cases at a total price calculated by adding a purchase price of fuel and software to a deposit (for example, see Patent Literature 1).

CITATION LIST

Patent Literature

[Patent Literature 1] Japanese Unexamined Patent Application Publication No. 2003-229160

Technical Problem

However, when a manufacturer only receives a deposit at the time of the sale of a fuel cell system, for a user of the fuel cell system, it is difficult to promote a collection of the fuel cell system or promote a use of the fuel cell system in a mode to suppress its deterioration.

General Disclosure

According to a first aspect of the present invention, a management system is provided. The above-described management system manages a portable energy storage equipment, for example. The above-described management system includes, for example, a consideration decision unit configured to decide, when the portable energy storage equipment transferred from one body to another body as a first transfer at a first timing is transferred from the other body or still another body which is different from the other body to the one body as a second transfer at a second timing, for example, a consideration for the second transfer of the portable energy storage equipment at the second timing based on at least one of (i) a length of a period from the first timing to the second timing and (ii) a deterioration state of the portable energy storage equipment at the second timing. The above-described management system may include at least one of a first information obtaining unit configured to obtain information indicating the first timing and information indicating the second timing, and a second information obtaining unit configured to obtain deterioration information indicating a deterioration state of the portable energy storage equipment at the second timing. In the above-described management system, the consideration decision unit may decide the consideration for the second transfer of the portable energy storage equipment at the second timing based on at least one of (i) a length of an elapsed period at the second timing from the first timing, the length being indicated by the information indicating the first timing and the information indicating the second timing which are obtained by the first information obtaining unit, and (ii) the deterioration state of the portable energy storage equipment at the second timing indicated by the deterioration information obtained by the second information obtaining unit.

In the above-described management system, the first timing may be a timing at which a possession of the portable energy storage equipment is transferred from a first possessor to a second possessor. In the above-described management system, the second timing is a timing at which the possession of the portable energy storage equipment may be transferred from the second possessor to the first possessor.

In the above-described management system, the first transfer may be an assignment of the portable energy storage equipment. In the above-described management system, the second transfer may be a reassignment of the portable energy storage equipment. In the above-described management system, the reassignment may be established based on a reservation between parties of the assignment at the first timing, and may be executed by the parties of the reservation or a successor of the reservation.

The above-described management system may include a collateral information obtaining unit configured to obtain collateral information related to a collateral for the second transfer of the portable energy storage equipment, the collateral being provided at the first timing. In the above-described management system, the consideration decision unit may decide the consideration at the second timing based on (A) at least one of the length of the period from the first timing to the second timing and the deterioration state of the portable energy storage equipment at the second timing, and (B) a value of the collateral indicated by the collateral information.

The above-described management system may include a collateral information obtaining unit configured to obtain collateral information related to a collateral for the second transfer of the portable energy storage equipment, the collateral being provided at the first timing. The above-described management system may include a value evaluation unit configured to evaluate a value of the portable energy storage equipment at the second timing based on at least one of the length of the period from the first timing to the second timing, and the deterioration state of the portable energy storage equipment at the second timing. In the above-described management system, the consideration decision unit may decide a total of a value of the collateral indicated by the collateral information and the value of the portable energy storage equipment evaluated by the value evaluation unit as the consideration at the second timing. In the above-described management system, the value of the portable energy storage equipment evaluated by the value evaluation unit may be a positive value, 0, or a negative value.

The above-described management system may include an event detection unit configured to detect a generation of an event related to the portable energy storage equipment. In the above-described management system, the consideration decision unit may decide the consideration at the second timing based on (A) at least one of the length of the period from the first timing to the second timing and the deterioration state of the portable energy storage equipment at the second timing, and (C) contents of the event detected by the event detection unit in the period from the first timing to the second timing.

In the above-described management system, when the second timing satisfies a predetermined first condition, the consideration decision unit may decide the consideration such that the consideration at the second timing is further increased (i) as the period from the first timing to the second timing is longer, or (ii) as the deterioration of the portable energy storage equipment further progresses. In the above-described management system, when the second timing satisfies a predetermined second condition, the consideration decision unit may decide the consideration such that the consideration at the second timing is further decreased (i) as the period from the first timing to the second timing is longer, or (ii) as the deterioration of the portable energy storage equipment further progresses.

In the above-described management system, when the length of the period from the first timing to the second timing satisfies a predetermined third condition, the consideration decision unit may (a) decide the consideration such that the consideration at the second timing is further decreased (i) as the period from the first timing to the second timing is longer, or (ii) as the deterioration of the portable energy storage equipment further progresses. In the above-described management system, the consideration decision unit may decide the consideration such that when the length of the period from the first timing to the second timing does not satisfy the third condition, the consideration at the second timing is further increased (i) as the period from the first timing to the second timing is longer, or (ii) as the deterioration of the portable energy storage equipment further progresses.

In the above-described management system, when the deterioration state of the portable energy storage equipment at the second timing satisfies a predetermined fourth condition, the consideration decision unit may (b) decide the consideration such that the consideration at the second timing is further decreased (i) as the period from the first timing to the second timing is longer, or (ii) as the deterioration of the portable energy storage equipment further progresses. In the above-described management system, the consideration decision unit may decide the consideration such that when the deterioration state of the portable energy storage equipment at the second timing does not satisfy the fourth condition, the consideration at the second timing is further increased (i) as the period from the first timing to the second timing is longer, or (ii) as the deterioration of the portable energy storage equipment further progresses.

The above-described management system may include a deterioration determination unit configured to determine whether the deterioration state of the portable energy storage equipment at the second timing satisfies a predetermined fifth condition. In the above-described management system, the consideration decision unit may decide the consideration such that the consideration is decreased when it is determined that the deterioration state of the portable energy storage equipment at the second timing satisfies the predetermined fifth condition as compared with a case where it is determined that the deterioration state of the portable energy storage equipment at the second timing does not satisfy the predetermined fifth condition.

According to a second aspect of the present invention, a program is provided. A non-transitory computer readable medium that stores the above-described program may also be provided. The above-described program may be a program for causing a computer to function as the above-described management system. The above-described program may be a program for causing the computer to execute one or a plurality of information processing procedures in the above-described management system.

According to a third aspect of the present invention, a management method is provided. The above-described management method is a method of managing portable energy storage equipment, for example. The above-described management method may be a method of managing the portable energy storage equipment by using a computer. The above-described management method includes, for example, deciding, when the portable energy storage equipment transferred from one body to another body as a first transfer at a first timing is transferred from the other body or still another body which is different from the other body to the one body as a second transfer at a second timing, a consideration for the second transfer of the portable energy storage equipment at the second timing based on at least one of (i) the length of the period from the first timing to the second timing and (ii) the deterioration state of the portable energy storage equipment at the second timing.

According to a fourth aspect of the present invention, a management server is provided. The above-described management server manages portable energy storage equipment, for example. The above-described management server includes, for example, a consideration decision unit configured to decide, when the portable energy storage equipment transferred from one body to another body as a first transfer at a first timing is transferred from the other body or still another body which is different from the other body to the one body as a second transfer at a second timing, a consideration for the second transfer of the portable energy storage equipment at the second timing based on at least one of (i) the length of the period from the first timing to the second timing and (ii) the deterioration state of the portable energy storage equipment at the second timing.

It is noted that the above-described summary clause of the invention does not necessarily describe all necessary features of the embodiments of the present invention. The present invention may also be a sub-combination of the features described above.

DESCRIPTION OF EXEMPLARY EMBODIMENTS

Figure 1:
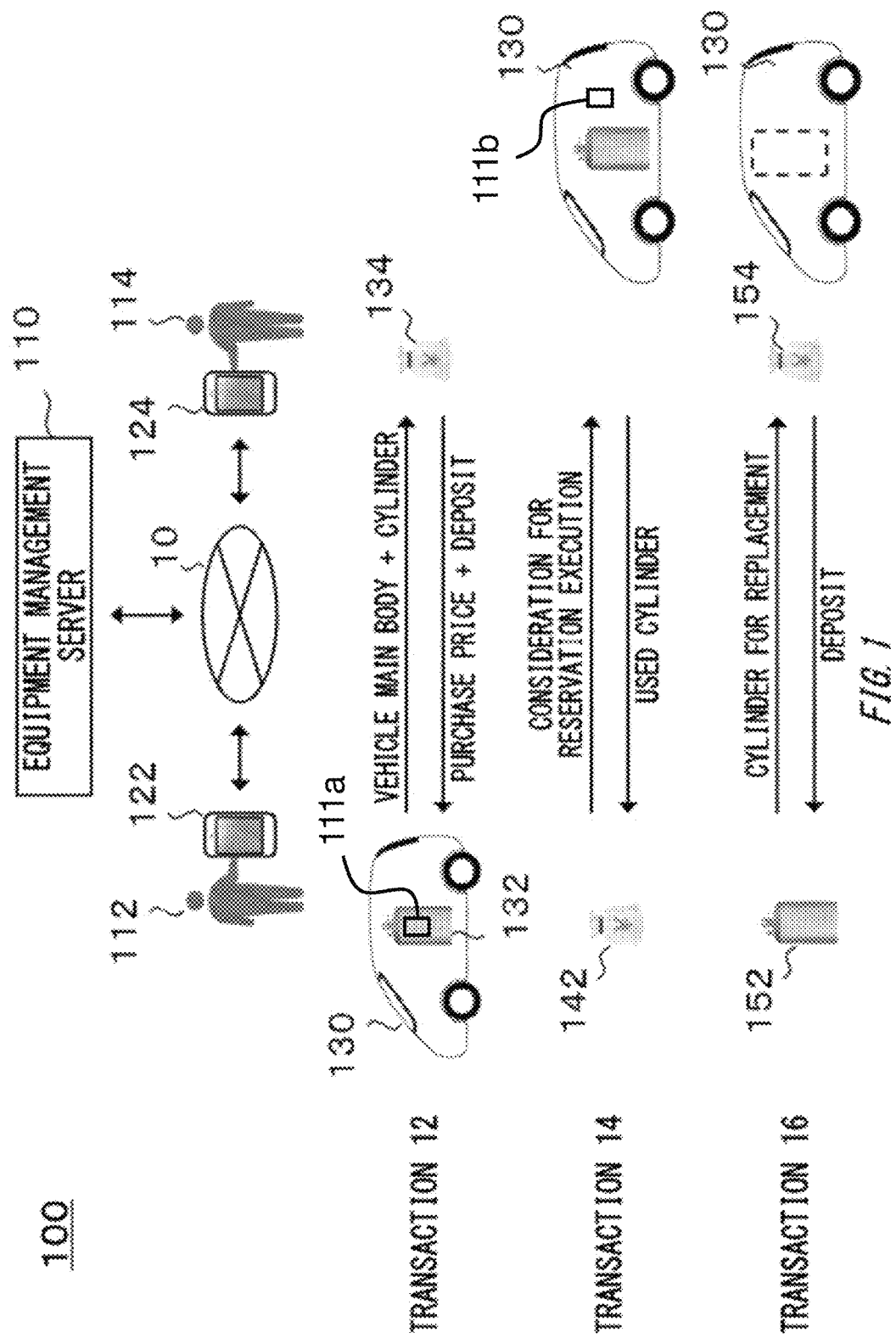
FIG. 1 schematically illustrates one example of a system configuration of an equipment management system 100.

Hereinafter, the present invention will be described by way of embodiments of the invention, but the following embodiments are not intended to limit the invention in the claims. In addition, not all combinations of features described according to the embodiments are necessarily imperative to solving means of the invention. It is noted that in the drawings, identical or similar parts may be assigned with the identical reference signs to omit duplicate descriptions in some cases.

[Outline of Equipment Management System 100]

FIG. 1 schematically illustrates one example of a system configuration of an equipment management system 100. According to the present embodiment, the equipment management system 100 includes an equipment management server 110. The equipment management system 100 may be one example of the management system. The equipment management server 110 may be one example of the management system and a management server.

According to the present embodiment, the equipment management system 100 manages one or a plurality of pieces of equipment. For example, the equipment management server 110 manages the one or the plurality of pieces of equipment. With regard to each of the one or the plurality of pieces of equipment, the equipment management server 110 may manage at least one of a state of the equipment, a transaction related to the equipment, and a contract related to the equipment. As the above-described equipment, (i) portable energy storage equipment, (ii) energy-use equipment using energy provided by the portable energy storage equipment, and the like are exemplified.

The portable energy storage equipment stores energy. As the energy, a fossil fuel, hydrogen, electricity, and the like are exemplified. As the portable energy storage equipment, a fuel container, a battery, and the like are exemplified. The portable energy storage equipment is transported by an animal or a movable object. The portable energy storage equipment may also be mounted to or carried by the animal, may also be mounted to the movable object, or may also be towed by the movable object.

The movable object may also be equipment that travels on land, may also be equipment that flies, or may also be equipment that sails in water or on water. The movable object may also move by an operation of a user, or may also move based on an autonomous movement function by a computer mounted to the movable object (which may be referred to as an auto cruise, cruise control, and the like in some cases). As the movable object, a vehicle, a marine vessel, a flight vehicle, and the like are exemplified. As the vehicle, a motor vehicle, a two-wheel motor vehicle, a train, and the like are exemplified.

As the motor vehicle, an engine vehicle, an electric motor vehicle, a fuel cell vehicle, a hybrid vehicle, a work machine, and the like are exemplified. As the two-wheel motor vehicle, (i) a motorcycle, (ii) a three-wheel motorcycle, (iii) a stand riding two-wheel vehicle such as Segway (registered trademark), Kickboard (registered trademark) with a power unit, a skateboard with a power unit, and the like are exemplified. As the marine vessel, a ship, a hovercraft, a watercraft, a submarine, a submersible vessel, an underwater scooter, and the like are exemplified. As the flight vehicle, an aircraft, an airship, an air ball, a balloon, a helicopter, a drone, and the like are exemplified.

According to the present embodiment, for a purpose to simplify the description, details of the equipment management system 100 will be described by using a case where the energy-use equipment is a fuel cell vehicle 130, and the portable energy storage equipment is a hydrogen cylinder 132 as an example. However, it is noted that the portable energy storage equipment and the energy-use equipment are not limited to the present embodiment.

In addition, according to the present embodiment, details of the equipment management system 100 will be described while various transactions between a seller 112 of a fuel cell vehicle 130 and a purchaser 114 of the fuel cell vehicle 130 are used as an example. However, it is noted that information managed by the equipment management system 100 is not limited to the present embodiment.

The equipment management system 100 may also include at least one of a communication terminal 122 of the seller 112 of the fuel cell vehicle 130 and a communication terminal 124 of the purchaser 114 of the fuel cell vehicle 130. The equipment management server 110 and at least one of the communication terminal 122 and the communication terminal 124 may transmit and receive information with each other via a communication network 10. The communication terminal 122 and the communication terminal 124 may transmit and receive the information with each other via the communication network 10.

According to the present embodiment, the communication network 10 may also be a transmission path of a wired communication, may also be a transmission path of a wireless communication, or may also be a combination of the transmission path of the wireless communication and the transmission path of the wired communication. The communication network 10 may also include a wireless packet communication network, the Internet, a pier-to-pier (P2P) network, a dedicated line, a virtual private network (VPN), a power line communication line, and the like. The communication network 10 (i) may also include a mobile communication network such as a mobile phone network, or (ii) may also include a wireless communication network such as a wireless MAN (for example, WiMAX (registered trademark), a wireless LAN (for example, WiFi (registered trademark), Bluetooth (registered trademark), Zigbee (registered trademark), or a near field communication (NFC).

According to the present embodiment, each of the communication terminal 122 and the communication terminal 124 may be equipment that can transmit and receive the information with another communication terminal via the communication network 10, and the details are not particularly limited. As the communication terminal 122 and the communication terminal 124, a personal computer, a mobile terminal, and the like are exemplified. As the mobile terminal, a mobile phone, a smartphone, a PDA, a tablet, a notebook computer or a laptop computer, a wearable computer, and the like are exemplified. At least one of the communication terminal 122 and the communication terminal 124 may be used as a user interface intervening between a user of the communication terminal and the equipment management server 110. At least one of the communication terminal 122 and the communication terminal 124 may also include a function to authenticate the user of the communication terminal.

According to the present embodiment, details of the equipment management system 100 will be described by using a case as an example where the equipment management server 110 manages states of various types of equipment, a transaction related to the equipment, a contract related to the equipment, and the like. However, the equipment management system 100 is not limited to the present embodiment. According to another embodiment, a part of functions of the equipment management server 110 may be realized by at least one of the communication terminal 122 and the communication terminal 124. According to still another embodiment, at least one of the communication terminal 122 and the communication terminal 124 may be used instead of the equipment management server 110 according to the present embodiment. In this case, it is also sufficient when the equipment management system 100 does not include the equipment management server 110. In addition, in this case, at least one of the communication terminal 122 and the communication terminal 124 may be one example of the management system and the management server.

[Outline of Transaction Related to Fuel Cell Vehicle 130 and Hydrogen Cylinder 132]

According to the present embodiment, first, the transaction 12 is executed between the seller 112 of the fuel cell vehicle 130 and the purchaser 114 of the fuel cell vehicle 130. After that, the transaction 14 and the transaction 16 are executed. It is noted that the transactions 14 and 16 may be repeatedly executed. In addition, it is also sufficient when the transaction 16 is not executed.

[Outline of Transaction 12]

According to the present embodiment, in the transaction 12, the seller 112 sells the fuel cell vehicle 130 to which a hydrogen cylinder 132 is mounted to the purchaser 114. The hydrogen cylinder 132 may also be a new product, or may also be a used product. Thereby, the possession of the hydrogen cylinder 132 is transferred from the seller 112 to the purchaser 114. The seller 112 may be one body and one example of a first possessor. The purchaser 114 may be another body and one example of a second possessor.

According to one embodiment, the hydrogen cylinder 132 may be assigned to the purchaser 114 in the transaction 12. In this case, an ownership of the hydrogen cylinder 132 is transferred to the purchaser 114. An assignment may be one example of a first transfer.

In addition, in association with the transaction 12, a special arrangement may be concluded between the seller 112 and the purchaser 114 with regard to reassignment of the hydrogen cylinder 132 from the purchaser 114 to the seller 112 in future (which may be referred to as the special arrangement related to the reassignment in some cases). A conclusion timing of the above-described special arrangement may also be at the same time as a conclusion timing of an assignment contract of the transaction 12, or may also be a different timing from the conclusion timing of the assignment contract of the transaction 12.

The reassignment may be one example of a second transfer. The above-described special arrangement may be one example of a reservation between the parties of the assignment. A reserved right may also be assigned. In other words, the above-described special arrangement may executed by the party of the reservation or its successor. In a case where the reserved right is assigned, the successor of the right (for example, the successor of the special arrangement related to the reassignment) may be one example of still another body. In a case where the reserved right is assigned, instead of the purchaser 114, the above-described successor reassigns the hydrogen cylinder 132 to the seller 112.

According to another embodiment, in the transaction 12, the hydrogen cylinder 132 may be lent to the purchaser 114. In this case, the ownership of the hydrogen cylinder 132 is reserved by (i) the seller 112 or (ii) a third party other than the seller 112 and the purchaser 114. A lease may be one example of the first transfer.

In addition, in association with the transaction 12, a special arrangement may be concluded between the seller 112 and the purchaser 114 with regard to return of the hydrogen cylinder 132 from the purchaser 114 to the seller 112 in future (which may be referred to the special arrangement related to the return in some cases). A conclusion timing of the above-described special arrangement may also be at the same time as the conclusion timing of the assignment contract of the transaction 12, or may also be a different timing from the conclusion timing of the assignment contract of the transaction 12.

The return may be one example of the second transfer. The above-described special arrangement may be one example of the reservation between the parties of the assignment. The reserved right may also be assigned. In other words, the above-described special arrangement may be executed by the party of the reservation or its successor. In a case where the reserved right is assigned, the successor of the right (for example, the successor of the special arrangement related to the return) may be one example of still another body. In a case where the reserved right is assigned, instead of the purchaser 114, the above-described successor returns the hydrogen cylinder 132 to the seller 112.

According to the present embodiment, the purchaser 114 pays a deposit 134 to the seller 112 for a purpose to ensure (i) the execution of the special arrangement related to the reassignment by the purchaser 114 or (ii) the execution of the special arrangement related to the return by the purchaser 114. The deposit 134 may be separately paid in addition to (i) a purchase price of the fuel cell vehicle 130 or (ii) a purchase price of the fuel cell vehicle 130 and the hydrogen cylinder 132. The deposit 134 may be one example of a collateral for the reassignment or return of the hydrogen cylinder 132. It is noted that according to another embodiment, it is also sufficient when the purchaser 114 does not pay the deposit 134 in the transaction 12.

[Outline of Transaction 14]

According to the present embodiment, next, in the transaction 14, the purchaser 114 executes the special arrangement related to the reassignment which has been concluded in association with the transaction 12 or the special arrangement related to the return which has been concluded in association with the transaction 12. In other words, the purchaser 114 reassigns or returns the hydrogen cylinder 132 mounted to the fuel cell vehicle 130 to the seller 112. Thereby, the possession of the hydrogen cylinder 132 is transferred from the purchaser 114 to the seller 112.

In the transaction 14, the seller 112 who has collected the hydrogen cylinder 132 pays, to the purchaser 114, a consideration 142 for the execution of the special arrangement related to the reassignment or the special arrangement related to the return (which may be referred to as an execution consideration in some cases). According to the present embodiment, the consideration 142 fluctuates in a period from the transaction 12 to the transaction 14. For example, the consideration 142 is decided based on at least one of (i) a value of the deposit 134, (ii) a length of the period from the transaction 12 to the transaction 14, (iii) a deterioration state of the hydrogen cylinder 132 at a time point of the transaction 14, and (iv) contents of events generated between the transaction 12 and the transaction 14. It is noted that even in a case where the purchaser 114 does not pay the deposit 134 in the transaction 12, the seller 112 may also pay the consideration 142 to the purchaser 114. The length of the period from the transaction 12 to the transaction 14 may be a length of an elapsed period at a timing at which the transaction 14 is executed from a timing at which the transaction 12 is executed.

The consideration 142 may also be a monetary value, may also be an electronic value, or may also be an asset value. As the monetary value, money, coins, and the like are exemplified. As the electronic value, points, mileages, electronic money, and the like are exemplified. As the asset value, a cryptocurrency is exemplified. It is noted that the cryptocurrency may also be one example of the monetary value or the electronic value depending on a country.

According to the present embodiment, as compared with a case where the amount of the deposit does not fluctuate over time, the seller 112 can control a collection timing of the hydrogen cylinder 132. In addition, as compared with a case where the amount of the deposit does not fluctuate over time, the seller 112 can control a use mode of the hydrogen cylinder 132 by the purchaser 114.

[Outline of Transaction 16]

According to the present embodiment, next, in the transaction 16, the seller 112 assigns or lends a hydrogen cylinder 152 for replacement to the purchaser 114. Thereby, the possession of the hydrogen cylinder 152 is transferred from the seller 112 to the purchaser 114. In addition, in association with the transaction 16, a special arrangement related to a reassignment of the hydrogen cylinder 152 or a special arrangement related to a return of the hydrogen cylinder 152 is concluded between the seller 112 and the purchaser 114. Furthermore, in the transaction 16, the purchaser 114 pays a deposit 154 to the seller 112 for a purpose to ensure (i) the execution of the special arrangement related to the reassignment by the purchaser 114 or (ii) the execution of the special arrangement related to the return by the purchaser 114.

The hydrogen cylinder 152 may be one example of a portable energy storage equipment. The deposit 154 may be one example of a collateral for the reassignment or return of the hydrogen cylinder 152.

In a case where the purchaser 114 executes the special arrangement related to the reassignment concluded in association with the transaction 16 or the special arrangement related to the return concluded in association with the transaction 16, the similar processing to the transaction 14 may be executed. In other words, the possession of the hydrogen cylinder 152 is transferred from the purchaser 114 to the seller 112. In addition, the seller 112 who has collected the hydrogen cylinder 152 pays, to the purchaser 114, a consideration for the execution of the special arrangement related to the reassignment or the special arrangement related to the return.

[Specific Configuration of Each Unit of Equipment Management System 100]

Each unit of the equipment management system 100 may also be realized by hardware, may also be realized by software, or may also be realized by hardware and software. At least a part of each unit of the equipment management system 100 may also be realized by a single server, or may also be realized by a plurality of servers. At least a part of each unit of the equipment management system 100 may also be realized on a virtual machine or a cloud system. At least a part of each unit of the equipment management system 100 may also be realized by a personal computer or a mobile terminal. As the mobile terminal, a mobile phone, a smartphone, a PDA, a tablet, a notebook computer or a laptop computer, a wearable computer, and the like are exemplified. Each unit of the equipment management system 100 may also use a distributed type ledger technology such as a block chain or a distributed type network to store the information.

When at least a part of components forming the equipment management system 100 is realized by software, the component realized by the software may be realized when a program defining an operation related to the component is activated in an information processing apparatus having a general configuration. The above-described information processing apparatus includes, for example, (i) a data processing apparatus having a processor such as a CPU or a GPU, a ROM, a RAM, a communication interface, and the like, (ii) an input apparatus such as a keyboard, a touch panel, a camera, a microphone, various types of sensors, or a GPS receiver, (iii) an output apparatus such as a display apparatus, a speaker, or a vibration apparatus, and (iv) a storage device such as a memory or an HDD (including an external storage device). In the above-described information processing apparatus, the above-described data processing apparatus or storage device may store the program. The above-described program may be stored in a non-transitory computer-readable recording medium. When the above-described program is executed by the processor, the above-described information processing apparatus is caused to execute the operation defined by the program.

The program may also be stored in a computer-readable medium such as a CD-ROM, a DVD-ROM, a memory, or a hard disk, or may also be stored in a storage device connected to a network. The program may be installed from the computer-readable medium or the storage device connected to the network to the computer forming at least a part of the equipment management system 100. When the program is executed, the computer may also function as at least a part of each unit of the equipment management system 100. The program for causing the computer to function as at least a part of each unit of the equipment management system 100 may include a module defining the operation of each unit of the equipment management system 100. These programs or modules work with the data processing apparatus, the input apparatus, the output apparatus, the storage device, and the like to cause the computer to function as each unit of the equipment management system 100, or cause the computer to execute an information processing method in each unit of the equipment management system 100. When the program is read by the computer, information processing described in the program functions as specific means in which software associated with the program and various types of hardware resources of the equipment management system 100 work in cooperation with each other. Then, the above-described specific means realizes computation or process of information in accordance with a use purpose of the computer according to the present embodiment, so that the equipment management system 100 in accordance with the use purpose is constructed.

The above-described program may be a program for the computer to function as the equipment management server 110. The above-described program may be a program for the computer to execute one or a plurality of procedures related to the information processing in the equipment management server 110. The information processing in the equipment management server 110 may be information processing related to a management method to manage the portable energy storage equipment. The above-described management method has, for example, a consideration decision step of deciding, when the portable energy storage equipment transferred from one body to another body as the first transfer at the first timing is transferred from the other body or still another body which is different from the other body to the one body as the second transfer at the second timing, a consideration for the second transfer of the portable energy storage equipment at the second timing based on at least one of (i) the length of the period from the first timing to the second timing and (ii) the deterioration state of the portable energy storage equipment at the second timing.

According to another embodiment, the above-described management method has, for example, a second transfer information obtaining step of obtaining second transfer information indicating the second timing at which the portable energy storage equipment that is assigned or lent at the first timing is reassigned or returned. The above-described management method has, for example, at least one of a first transfer information obtaining step of obtaining first transfer information indicating the first timing and a deterioration information obtaining step of obtaining the deterioration information indicating the deterioration state of the portable energy storage equipment at the second timing. The above-described management method has, for example, a consideration decision step of deciding a consideration for the reassignment or return of the portable energy storage equipment at the second timing based on at least one of the length of the period from the first timing to the second timing and the deterioration state of the portable energy storage equipment indicated by the deterioration information.

[Outline of Each Unit of Equipment Management Server 110]

Figure 2:
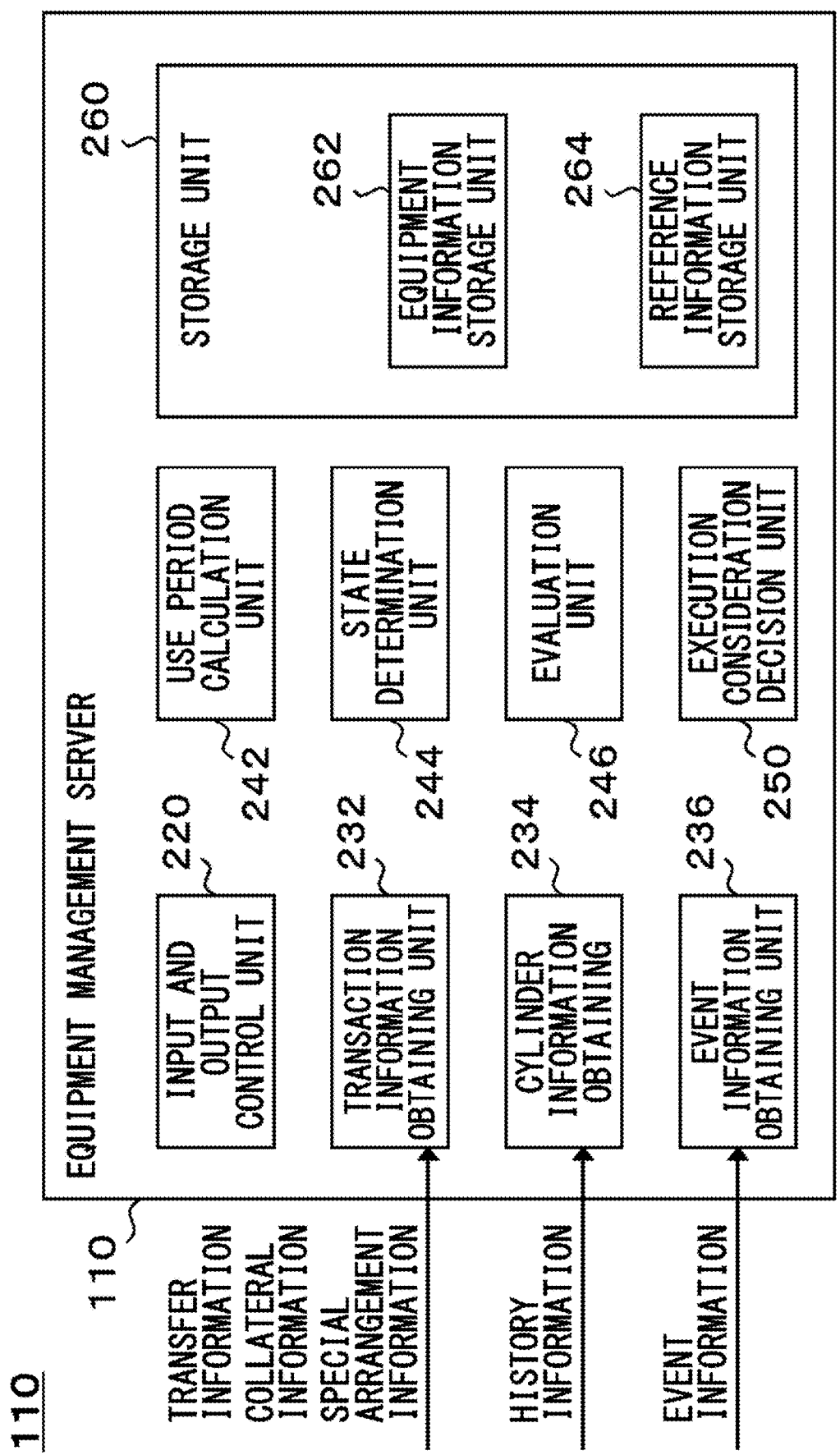
FIG. 2 schematically illustrates one example of an internal configuration of an equipment management server 110.

FIG. 2 schematically illustrates one example of an internal configuration of the equipment management server 110. According to the present embodiment, the equipment management server 110 includes an input and output control unit 220, a transaction information obtaining unit 232, a cylinder information obtaining unit 234, an event information obtaining unit 236, a use period calculation unit 242, a state determination unit 244, an evaluation unit 246, an execution consideration decision unit 250, and a storage unit 260. According to the present embodiment, the storage unit 260 has an equipment information storage unit 262 and a reference information storage unit 264. Each unit of the equipment management server 110 can transmit and receive the information with each other, for example.

The transaction information obtaining unit 232 may be one example of the first information obtaining unit or the collateral information obtaining unit. The cylinder information obtaining unit 234 may be one example of the second information obtaining unit. The event information obtaining unit 236 may be one example of the event detection unit. The state determination unit 244 may be one example of the deterioration determination unit. The evaluation unit 246 may be one example of the value evaluation unit. The execution consideration decision unit 250 may be one example of the consideration decision unit.

According to the present embodiment, the input and output control unit 220 controls an input to the equipment management server 110. In addition, the input and output control unit 220 controls an output from the equipment management server 110.

The input and output control unit 220 controls a communication between the equipment management server 110 and the external information processing apparatus. As the external information processing apparatus, the communication terminal 122, the communication terminal 124, and the like are exemplified. The input and output control unit 220 may be a communication interface. The input and output control unit 220 may be compatible to plural types of communication methods.

The input and output control unit 220 may obtain information input to the input unit (not illustrated) of the equipment management server 110. As the input unit, a keyboard, a pointing device, a touch panel, a microphone, a camera, and the like are exemplified. The input and output control unit 220 may also output the information to the output unit (not illustrated) of the equipment management server 110. As the output unit, a display, a projector, a speaker, and the like are exemplified.

According to the present embodiment, the transaction information obtaining unit 232 obtains the information related to the transaction of the equipment. As the information related to the transaction, information indicating the timing of the transaction, a contract to be concluded due to the transaction, information related to a special arrangement or reservation, information related to a value exchanged due to the transaction, and the like are exemplified. The value exchanged due to the transaction may also be a monetary value, may also be an electronic value, or may also be an asset value. The value exchanged due to the transaction may be a collateral for the reassignment or return of the equipment. The deposit 134 may be one example of the value exchanged due to the transaction of the hydrogen cylinder 132. The deposit 154 may be one example of the value exchanged due to the transaction of the hydrogen cylinder 152.

The transaction information obtaining unit 232 obtains, from the input unit (not illustrated) of the equipment management server 110, for example, the information related to the transaction of the equipment which is input to the input unit. The transaction information obtaining unit 232 may obtain, from the communication terminal 122, the information related to the transaction of the equipment which is input to the communication terminal 122. The transaction information obtaining unit 232 may obtain, from the communication terminal 124, the information related to the transaction of the equipment which is input to the communication terminal 124.

According to one embodiment, the transaction information obtaining unit 232 obtains the information indicating the timing at which the transaction 12 is executed. The timing at which the transaction 12 is executed may be one example of the first timing. The information indicating the timing at which the transaction 12 is executed may be one example of the information indicating the first timing. The timing at which the transaction 12 is executed may be one example of the timing at which the possession of the hydrogen cylinder 132 is transferred from the seller 112 to the purchaser 114.

According to another embodiment, the transaction information obtaining unit 232 obtains the information indicating the timing at which the transaction 14 is executed. The timing at which the transaction 14 is executed may be one example of the timing at which the hydrogen cylinder 132 assigned or lent in the transaction 12 is reassigned or returned. The timing at which the transaction 14 is executed may be one example of the second timing. The information indicating the timing at which the transaction 14 is executed may be one example of the information indicating the second timing. The timing at which the transaction 14 is executed may be one example of the timing at which the possession of the hydrogen cylinder 132 is transferred from the purchaser 114 to the seller 112.

According to still another embodiment, the transaction information obtaining unit 232 obtains the information indicating the timing at which the transaction 16 is executed. The timing at which the transaction 16 is executed may be one example of the first timing. The information indicating the timing at which the transaction 16 is executed may be one example of the information indicating the first timing. The timing at which the transaction 16 is executed may be one example of the timing at which the possession of the hydrogen cylinder 152 is transferred from the seller 112 to the purchaser 114.

According to still another embodiment, the transaction information obtaining unit 232 obtains information indicating the timing at which the hydrogen cylinder 152 assigned or lent in the transaction 16 is reassigned or returned. The timing at which the hydrogen cylinder 152 assigned or lent in the transaction 16 is reassigned or returned may be one example of the second timing. The information indicating the timing at which the hydrogen cylinder 152 assigned or lent in the transaction 16 is reassigned or returned may be one example of the information indicating the second timing. The timing at which the hydrogen cylinder 152 assigned or lent in the transaction 16 is reassigned or returned may be one example of the timing at which the possession of the hydrogen cylinder 152 is transferred from the purchaser 114 to the seller 112.

According to still another embodiment, the transaction information obtaining unit 232 obtains information related to at least one of the deposit 134 and the deposit 154. The deposit 134 may be one example of the collateral for the reassignment or return of the hydrogen cylinder 132. The deposit 134 may be one example of the collateral provided at the timing at which the transaction 12 is executed. The deposit 154 may be one example of the collateral for the reassignment or return of the hydrogen cylinder 152. The deposit 154 may be one example of the collateral provided at the timing at which the transaction 16 is executed. The information related to at least one of the deposit 134 and the deposit 154 may be one example of collateral information.

According to the present embodiment, the cylinder information obtaining unit 234 obtains various types of information related to states of the equipment. For example, the cylinder information obtaining unit 234 obtains the information related to at least one of hydrogen cylinder 132 and the hydrogen cylinder 152. The cylinder information obtaining unit 234 may obtain the information related to a use history of each of the hydrogen cylinders. The information related to the use history of the hydrogen cylinder may be one example of the deterioration information.

The cylinder information obtaining unit 234 may obtain (i) the information of the use history of the hydrogen cylinder 132 at the timing at which the transaction 14 is executed, (ii) the information related to the use history of the hydrogen cylinder 152 at the timing at which the hydrogen cylinder 152 assigned or lent in the transaction 16 is reassigned or returned, and the like. The information related to the use history of each of the hydrogen cylinders may also be an actual record value, or may also be a prediction value.

As the information related to the use history of the hydrogen cylinder, a temperature of the hydrogen cylinder, a history of a pressure or the remaining amount of hydrogen, a history of an operation on the hydrogen cylinder, and the like are exemplified. As the history of the operation on the hydrogen cylinder, histories of mounting and detachment of the hydrogen cylinder 132 to and from the fuel cell vehicle 130, filling of hydrogen to the hydrogen cylinder 132, and the like are exemplified.

The information related to at least one of the hydrogen cylinder 132 and the hydrogen cylinder 152 may be obtained at a predetermined timing. As the predetermined timing, (i) a timing at which a predetermined time has arrived, (ii) a timing at which a predetermined period has elapsed since the above-described information is obtained last time, (iii) a timing at which the seller 112, the purchaser 114, or the fuel cell vehicle 130 outputs an instruction to obtain the above-described information, and the like are exemplified. The information related to at least one of the hydrogen cylinder 132 and the hydrogen cylinder 152 may be stored in the storage device 111a disposed in the hydrogen cylinder 132 or the hydrogen cylinder 152 or the storage device 111b disposed in the fuel cell vehicle 130.

The cylinder information obtaining unit 234 may obtain the information related to at least one of the hydrogen cylinder 132 and the hydrogen cylinder 152 at any timing. For example, the cylinder information obtaining unit 234 obtains the above-described information at a timing at which a communication with the fuel cell vehicle 130, the hydrogen cylinder 132, or the hydrogen cylinder 152 can be performed. The cylinder information obtaining unit 234 may obtain the above-described information at a predetermined timing by accessing storage device disposed in the fuel cell vehicle 130, the hydrogen cylinder 132, or the hydrogen cylinder 152. As the predetermined timing, (i) a timing at which a predetermined time has arrived, (ii) a timing at which a predetermined period has elapsed since the above-described information is obtained last time, (iii) a timing at which the instruction to obtain the above-described information is received from the seller 112, the purchaser 114, an administrator of the equipment management server 110, or the like are exemplified.

According to the present embodiment, the event information obtaining unit 236 obtains information of an event (which may be referred to as event information in some cases) related to the equipment. For example, the event information obtaining unit 236 obtains the event information related to at least one of the hydrogen cylinder 132 and the hydrogen cylinder 152. As the above-described event information, information related to a promotion activity to promote collection of the hydrogen cylinder, information related to recalling of the hydrogen cylinder, and the like are exemplified. For example, the event information obtaining unit 236 detects the generation of the event related to at least one of the hydrogen cylinder 132 and the hydrogen cylinder 152 by receiving the event information from the external information processing apparatus.

According to the present embodiment, the use period calculation unit 242 calculates a period in which the purchaser 114 uses or possesses the equipment. For example, the use period calculation unit 242 calculates a length of the period from the timing at which the transaction 12 is executed to the timing at which the transaction 14 is executed. The use period calculation unit 242 may also calculate a length of the period from the timing at which the transaction 16 is executed to the timing at which the hydrogen cylinder 152 assigned or lent in the transaction 16 is reassigned or returned.

According to the present embodiment, the state determination unit 244 determines the deterioration state of the equipment. For example, the state determination unit 244 decides the deterioration state of at least one of the hydrogen cylinder 132 and the hydrogen cylinder 152. The state determination unit 244 determines whether the deterioration state of at least one of the hydrogen cylinder 132 and the hydrogen cylinder 152 satisfies a predetermined fifth condition.

The state determination unit 244 may determine whether the deterioration state of the hydrogen cylinder 132 at the timing at which the transaction 14 is executed satisfies the predetermined fifth condition. The state determination unit 244 may determine whether the deterioration state of the hydrogen cylinder 152 satisfies the predetermined fifth condition at the timing at which the hydrogen cylinder 152 assigned or lent in the transaction 16 is reassigned or returned.

The deterioration state of the hydrogen cylinder may be a parameter indicating a progress status of the deterioration of the hydrogen cylinder. The deterioration state of the hydrogen cylinder may also be represented by a continuous numeric value or may also be represented by a stage classification. Each classification may also be distinguished by a symbol or a character or may also be distinguished by a numeral.

The deterioration state of the hydrogen cylinder may be decided based on at least one of a mounted period, a use period, a use count, and a filling count of the hydrogen cylinder. The mounted period of the hydrogen cylinder may be a period in which the hydrogen cylinder is mounted to a hydrogen supply apparatus. The use period of the hydrogen cylinder may be a period in which hydrogen is supplied from the hydrogen cylinder to the outside in the mounted period of the hydrogen cylinder. The use count of the hydrogen cylinder may be an activation count or a stop count of the hydrogen supply apparatus mounted to the hydrogen cylinder.

The deterioration state of the hydrogen cylinder is decided, for example, based on at least one of an accumulated value of the mounted period of the hydrogen cylinder, an accumulated value of the use period of the hydrogen cylinder, an aggregate value of the use count of the hydrogen cylinder, and an aggregate value of the filling count of the hydrogen cylinder. The state determination unit 244 may decide the deterioration state of the hydrogen cylinder based on the information related to the use history of the hydrogen cylinder which is obtained by the cylinder information obtaining unit 234.

The above-described fifth condition may also be a condition that the deterioration progresses more than a predetermined deterioration state. As the above-described fifth condition, a condition that the accumulated value of the mounted period of the hydrogen cylinder is higher than a predetermined value, a condition that the accumulated value of use period of the hydrogen cylinder of is higher than a predetermined value, a condition that the aggregate value of the use count of the hydrogen cylinder is higher than a predetermined value, a condition that the aggregate value of the filling count of the hydrogen cylinder is higher than a predetermined value, and the like are exemplified.

When the portable energy storage equipment is a battery, as the deterioration state of the portable energy storage equipment, a deterioration state of a charge capacity, a deterioration state of a charge and discharge efficiency, and the like are exemplified. The deterioration state of the portable energy storage equipment is decided, for example, based on at least one of the charge capacity at a fully charged time, a charge and discharge curve, the charging count, and the use period.

When the portable energy storage equipment is the battery, the above-described fifth condition may be a condition that the deterioration progresses more than the predetermined deterioration state. As the above-described fifth condition, a condition that the charge capacity at the fully charged time of the battery is higher than predetermined value, a condition that electromotive force of the battery is higher than a predetermined value, a condition that an internal resistance value of the battery is lower than a predetermined value, a condition that the aggregate value of the charging count of the battery is higher than a predetermined value, a condition that a cumulative value of the use period of the battery is higher than a predetermined value, and the like are exemplified. The above-described fifth condition may also be (i) a condition that a ratio of the current charge capacity at the fully charged time to the charge capacity at the fully charged time in an initial state is lower than a predetermined value, (ii) a condition that a ratio of the current electromotive force to the electromotive force in the initial state is lower than a predetermined value, or (iii) a condition that a ratio of the current internal resistance value to the internal resistance value in the initial state is higher than a predetermined value.

When the portable energy storage equipment is a fuel container of a fossil fuel, the deterioration state of the portable energy storage equipment is decided, for example, based on a use period of the fuel container. The deterioration state of the fuel container may be decided based on an accumulated value of the use period of the fuel container. When the portable energy storage equipment is a fuel container of the fossil fuel, the above-described fifth condition may also be a condition that the deterioration progresses more than a predetermined deterioration state. The above-described fifth condition may be a condition that the accumulated value of the use period of the fuel container is higher than a predetermined value. It is noted that the fuel container is a pressurized container, the deterioration state of the fuel container may be decided by a technique similar to the deterioration state of the hydrogen cylinder. In this case, the above-described fifth condition may be a similar condition to the fifth condition related to the hydrogen cylinder.

According to the present embodiment, the evaluation unit 246 evaluates a value of the equipment. The evaluation unit 246 may evaluate the value of at least one of the hydrogen cylinder 132 and the hydrogen cylinder 152 at any timing. The evaluation unit 246 may evaluate the value of at least one of the hydrogen cylinder 132 and the hydrogen cylinder 152 at any timing based on at least one of (i) the length of the period in which the purchaser 114 uses or possesses each of the hydrogen cylinders at any timing which is calculated by the use period calculation unit 242, and (ii) the deterioration state if each of the hydrogen cylinders at any timing which is decided by the state determination unit 244.

For example, the evaluation unit 246 evaluates the value of the hydrogen cylinder 132 at a timing at which the transaction 14 is executed. The evaluation unit 246 may evaluate the value of the hydrogen cylinder 152 at a timing at which the hydrogen cylinder 152 assigned or lent in the transaction 16 is reassigned or returned. The value of each of the hydrogen cylinders which is evaluated by the evaluation unit 246 may also be a positive value, may also be 0, or may also be a negative value.

According to the present embodiment, the execution consideration decision unit 250 decides a consideration for the purchaser 114 to execute the special arrangement related to the reassignment or the special arrangement related to the return. For example, the execution consideration decision unit 250 decides the consideration for the reassignment or return of the hydrogen cylinder 132 at the timing at which the transaction 14 is executed. The execution consideration decision unit 250 may decide the consideration for the reassignment or return of the hydrogen cylinder 152 at the timing when the hydrogen cylinder 152 assigned or lent in the transaction 16 is reassigned or returned.

According to the present embodiment, the execution consideration decision unit 250 decides the above-described consideration based on at least one of (i) the length of the period in which the purchaser 114 uses or possesses each of the hydrogen cylinders at any timing which is calculated by the use period calculation unit 242, and (ii) the deterioration state of each of the hydrogen cylinders at any timing which is decided by the state determination unit 244. For example, the execution consideration decision unit 250 decides the consideration for the reassignment or return of the hydrogen cylinder 132 at the timing at which the transaction 14 is executed based on at least one of (i) the value of the deposit 134, (ii) the length of the period from the transaction 12 to the transaction 14, (iii) the deterioration state of the hydrogen cylinder 132 at the time point of the transaction 14, and (iv) the contents of the event generated between the transaction 12 and the transaction 14. The execution consideration decision unit 250 may decide the above-described consideration when the transaction 14 is executed. The execution consideration decision unit 250 may also decide the above-described consideration when the transaction 14 is supposedly executed before the transaction 14 is executed.

SPECIFIC EXAMPLE 1

According to one embodiment, when the timing at which the transaction 14 is executed satisfies a predetermined first condition, the execution consideration decision unit 250 decides a consideration such that the consideration for the reassignment or return of the hydrogen cylinder 132 at the timing at which the transaction 14 is executed is further increased (i) as the period from the transaction 12 to the transaction 14 is longer, or (ii) as the deterioration of the hydrogen cylinder 132 at the time point of the transaction 14 further progresses. The execution consideration decision unit 250 may decide the consideration for the reassignment or return of the hydrogen cylinder 152 at the timing at which the hydrogen cylinder 152 assigned or lent in the transaction 16 is reassigned or returned in accordance with the similar procedure.

Whether the timing at which the transaction 14 is executed satisfies the predetermined first condition is decided depending on whether the length of the period from the transaction 12 to the transaction 14 falls within a predetermined numerical range, for example. With regard to the above-described numerical range, only an upper limit may also be set, only a lower limit may also be set, or an upper limit and a lower limit may also be set. Whether the timing at which the transaction 14 is executed satisfies the predetermined first condition is decided depending on whether the deterioration state of the hydrogen cylinder 132 at the time point of the transaction 14 indicates that the deterioration progresses more than the predetermined deterioration state, for example.

SPECIFIC EXAMPLE 2

According to another embodiment, when the timing at which the transaction 14 is executed satisfies a predetermined second condition, the execution consideration decision unit 250 decides a consideration such that the consideration for the reassignment or return of the hydrogen cylinder 132 at the timing at which the transaction 14 is executed is further decreased (i) as the period from the transaction 12 to the transaction 14 is longer, or (ii) as the deterioration of the hydrogen cylinder 132 at the time point of the transaction 14 further progresses. The execution consideration decision unit 250 may decide the consideration for the reassignment or return of the hydrogen cylinder 152 at the timing at which the hydrogen cylinder 152 assigned or lent in the transaction 16 is reassigned or returned in accordance with the similar procedure.

Whether the timing at which the transaction 14 is executed satisfies the predetermined second condition is decided depending on whether the length of the period from the transaction 12 to the transaction 14 falls within a predetermined numerical range, for example. With regard to the above-described numerical range, only an upper limit may also be set, only a lower limit may also be set, or an upper limit and a lower limit may also be set. Whether the timing at which the transaction 14 is executed satisfies the predetermined second condition is decided depending on whether the deterioration state of the hydrogen cylinder 132 at the time point of the transaction 14 indicates that the deterioration progresses more than the predetermined deterioration state, for example.

The above-described numerical range associated with the second condition may also be identical to the above-described numerical range associated with the first condition, or may also be different from the above-described numerical range associated with the first condition. The above-described deterioration state associated with the second condition may also be identical to the above-described deterioration state associated with the first condition, or may also be different from the above-described deterioration state associated with the first condition. The second condition may also be a condition that the first condition is not satisfied.

SPECIFIC EXAMPLE 3

According to still another embodiment, when the length of the period from the transaction 12 to the transaction 14 satisfies a predetermined third condition, the execution consideration decision unit 250 decides a consideration such that the consideration for the reassignment or return of the hydrogen cylinder 132 at the timing at which the transaction 14 is executed is further decreased (i) as the period from the transaction 12 to the transaction 14 is longer, or (ii) as the deterioration of the hydrogen cylinder 132 at the time point of the transaction 14 further progresses. On the other hand, when the length of the period from the transaction 12 to the transaction 14 does not satisfy the predetermined third condition, the execution consideration decision unit 250 decides the consideration such that the consideration for the reassignment or return of the hydrogen cylinder 132 at the timing at which the transaction 14 is executed is further increased (i) as the period from the transaction 12 to the transaction 14 is longer, or (ii) as the deterioration of the hydrogen cylinder 132 at the time point of the transaction 14 further progresses. When the length of the period from the transaction 12 to the transaction 14 does not satisfy the predetermined third condition, the execution consideration decision unit 250 may also decide a predetermined value as the consideration for the reassignment or return of the hydrogen cylinder 132. The execution consideration decision unit 250 may decide the consideration for the reassignment or return of the hydrogen cylinder 152 at the timing at which the hydrogen cylinder 152 assigned or lent in the transaction 16 is reassigned or returned in accordance with the similar procedure.

The third condition may be a condition that the length falls within a predetermined numerical range. With regard to the above-described numerical range, only an upper limit may also be set, only a lower limit may also be set, or an upper limit and a lower limit may also be set.

SPECIFIC EXAMPLE 4

According to still another embodiment, when the deterioration state of the hydrogen cylinder 132 at the time point of the transaction 14 satisfies a predetermined fourth condition, the execution consideration decision unit 250 decides a consideration such that the consideration for the reassignment or return of the hydrogen cylinder 132 at the timing at which the transaction 14 is executed is further decreased (i) as the period from the transaction 12 to the transaction 14 is longer, or (ii) as the deterioration of the hydrogen cylinder 132 at the time point of the transaction 14 further progresses. On the other hand, when the deterioration state of the hydrogen cylinder 132 at the time point of the transaction 14 does not satisfy the predetermined fourth condition, the execution consideration decision unit 250 decides the consideration such that the consideration for the reassignment or return of the hydrogen cylinder 132 at the timing at which the transaction 14 is executed is further increased (i) as the period from the transaction 12 to the transaction 14 is longer, or (ii) as the deterioration of the hydrogen cylinder 132 at the time point of the transaction 14 further progresses. When the deterioration state of the hydrogen cylinder 132 at the time point of the transaction 14 does not satisfy the predetermined fourth condition, the execution consideration decision unit 250 also decides a predetermined value as the consideration for the reassignment or return of the hydrogen cylinder 132. The execution consideration decision unit 250 may decide the consideration for the reassignment or return of the hydrogen cylinder 152 at the timing at which the hydrogen cylinder 152 assigned or lent in the transaction 16 is reassigned or returned in accordance with the similar procedure.

The fourth condition may be a condition that the deterioration further progresses than a predetermined deterioration state. As the above-described fourth condition, a condition that the accumulated value of the mounted period of the hydrogen cylinder is higher than a predetermined value, a condition that the accumulated value of the use period of the hydrogen cylinder is higher than a predetermined value, a condition that the aggregate value of the use count of the hydrogen cylinder is higher than a predetermined value, a condition that the aggregate value of the filling count of the hydrogen cylinder is higher than a predetermined value, and the like are exemplified.

SPECIFIC EXAMPLE 5

According to still another embodiment, when it is determined that the deterioration state of the hydrogen cylinder 132 at the time point of the transaction 14 satisfies a predetermined fifth condition, the execution consideration decision unit 250 decides a consideration such that the consideration for the reassignment or return of the hydrogen cylinder 132 is further increased as compared with a case where the deterioration state of the hydrogen cylinder 132 at the timing at which the transaction 14 is executed does not satisfy the fifth condition. The execution consideration decision unit 250 may decide the consideration for the reassignment or return of the hydrogen cylinder 152 at the timing at which the hydrogen cylinder 152 assigned or lent in the transaction 16 is reassigned or returned in accordance with the similar procedure.

The fifth condition may be a condition that the deterioration further progresses than a predetermined deterioration state. The above-described deterioration state associated with the fifth condition may also be identical to the above-described deterioration state associated with the fourth condition, or may also be different from the above-described deterioration state associated with the fourth condition.

SPECIFIC EXAMPLE 6

According to still another embodiment, the execution consideration decision unit 250 decides a consideration for the reassignment or return of the hydrogen cylinder 132 at the timing at which the transaction 14 is executed based on (A) at least one of the length of the period from the transaction 12 to the transaction 14 and the deterioration state of the hydrogen cylinder 132 at the time point of the transaction 14 and (C) contents of an event detected in the period from the transaction 12 to the transaction 14. The execution consideration decision unit 250 may decide the consideration for the reassignment or return of the hydrogen cylinder 152 at the timing at which the hydrogen cylinder 152 assigned or lent in the transaction 16 is reassigned or returned in accordance with the similar procedure.

For example, when the contents of the event correspond to recalling of the hydrogen cylinder, the execution consideration decision unit 250 may decide a consideration such that the consideration for the reassignment or return of the hydrogen cylinder 132 is further included as the length of the period from the transaction 12 to the transaction 14 is shorter.

SPECIFIC EXAMPLE 7

According to still another embodiment, the execution consideration decision unit 250 decides a consideration for the reassignment or return of the hydrogen cylinder 132 at the timing at which the transaction 14 is executed based on (A) at least one of the length of the period from the transaction 12 to the transaction 14 and the deterioration state of the hydrogen cylinder 132 at the time point of the transaction 14 and (B) the value of the deposit 134 exchanged due to the transaction 12. For example, the execution consideration decision unit 250 decides the consideration for the reassignment or return of the hydrogen cylinder 132 at the timing at which the transaction 14 is executed by correcting the price of the deposit 134 provided due to the transaction 12 based on a predetermined algorithm. The execution consideration decision unit 250 may also decide the consideration for the reassignment or return of the hydrogen cylinder 132 at the timing at which the transaction 14 is executed based on the price of the deposit 134 provided due to the transaction 12 and an appraisal amount of the hydrogen cylinder 132 at the timing at which the transaction 14 is executed. The execution consideration decision unit 250 may decide the consideration for the reassignment or return of the hydrogen cylinder 152 at the timing at which the hydrogen cylinder 152 assigned or lent in the transaction 16 is reassigned or returned in accordance with the similar procedure.

According to one embodiment, the execution consideration decision unit 250 decides a total of the price of the deposit 134 provided due to the transaction 12 and a correction amount calculated by a predetermined procedure as the consideration for the reassignment or return of the hydrogen cylinder 132 at the timing at which the transaction 14 is executed. The execution consideration decision unit 250 may decide the above-described correction amount based on an idea similar to at least one of the ideas described in association with Specific Example 1 to Specific Example 6.

According to another embodiment, the execution consideration decision unit 250 calculates a product obtained by multiplying the price of the deposit 134 provided due to the transaction 12 by a correction factor calculated by a predetermined procedure as the consideration for the reassignment or return of the hydrogen cylinder 132 at the timing at which the transaction 14 is executed. The execution consideration decision unit 250 may decide the above-described correction factor based on an idea similar to at least one of the ideas described in association with Specific Example 1 to Specific Example 6.

According to still another embodiment, the execution consideration decision unit 250 decides an appraisal amount of the hydrogen cylinder 132 at the time point of the transaction 14 based on the evaluation of the hydrogen cylinder 132 at the time point of the transaction 14 which is decided by the evaluation unit 246. The execution consideration decision unit 250 decides a total of the price of the deposit 134 exchanged due to the transaction 12 and the appraisal amount of the hydrogen cylinder 132 at the time point of the transaction 14 as the consideration for the reassignment or return of the hydrogen cylinder 132 at the timing at which the transaction 14 is executed. The execution consideration decision unit 250 may decide the above-described appraisal amount based on an idea similar to at least one of the ideas described in association with Specific Example 1 to Specific Example 6.

According to the present embodiment, the storage unit 260 stores various types of information. According to the present embodiment, the equipment information storage unit 262 stores information related to each of one or more pieces of equipment. The equipment information storage unit 262 may store equipment identification information for identifying each of the one or more of equipment and information obtained by at least one of the transaction information obtaining unit 232, the cylinder information obtaining unit 234, and the event information obtaining unit 236 while being associated with each other. The equipment information storage unit 262 may store the equipment identification information for identifying each of the one or more of equipment and information output by at least one of the use period calculation unit 242, the state determination unit 244, the evaluation unit 246, and the execution consideration decision unit 250 while being associated with each other.

According to the present embodiment, the reference information storage unit 264 stores information serving as a reference for calculating the consideration for the reassignment or return of the hydrogen cylinder. The execution consideration decision unit 250 may decide the consideration for the reassignment or return of the hydrogen cylinder by referring to the information stored in the reference information storage unit 264.

Figure 3:
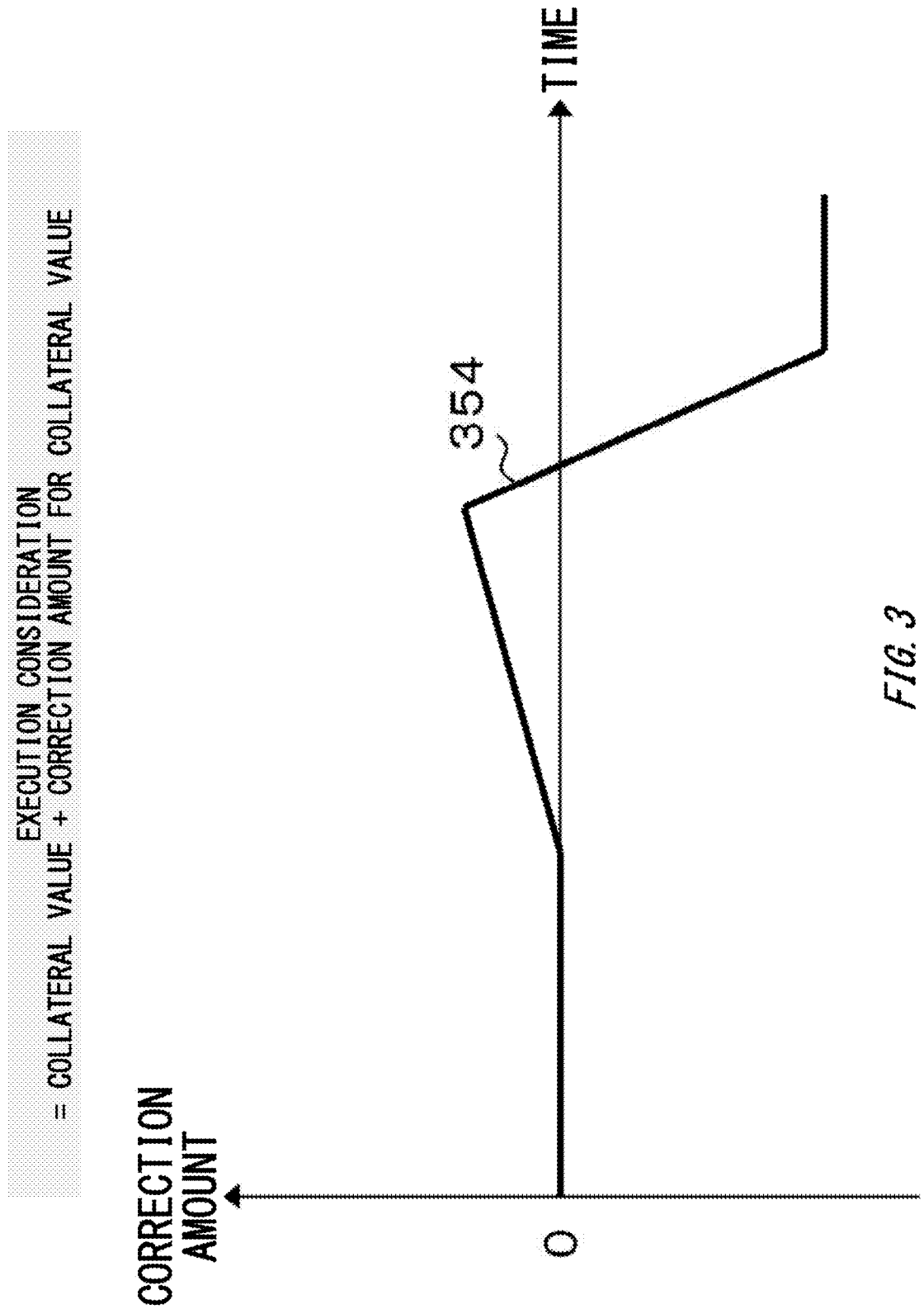
FIG. 3 schematically illustrates one example of a calculation method of an execution consideration.
Figure 4:
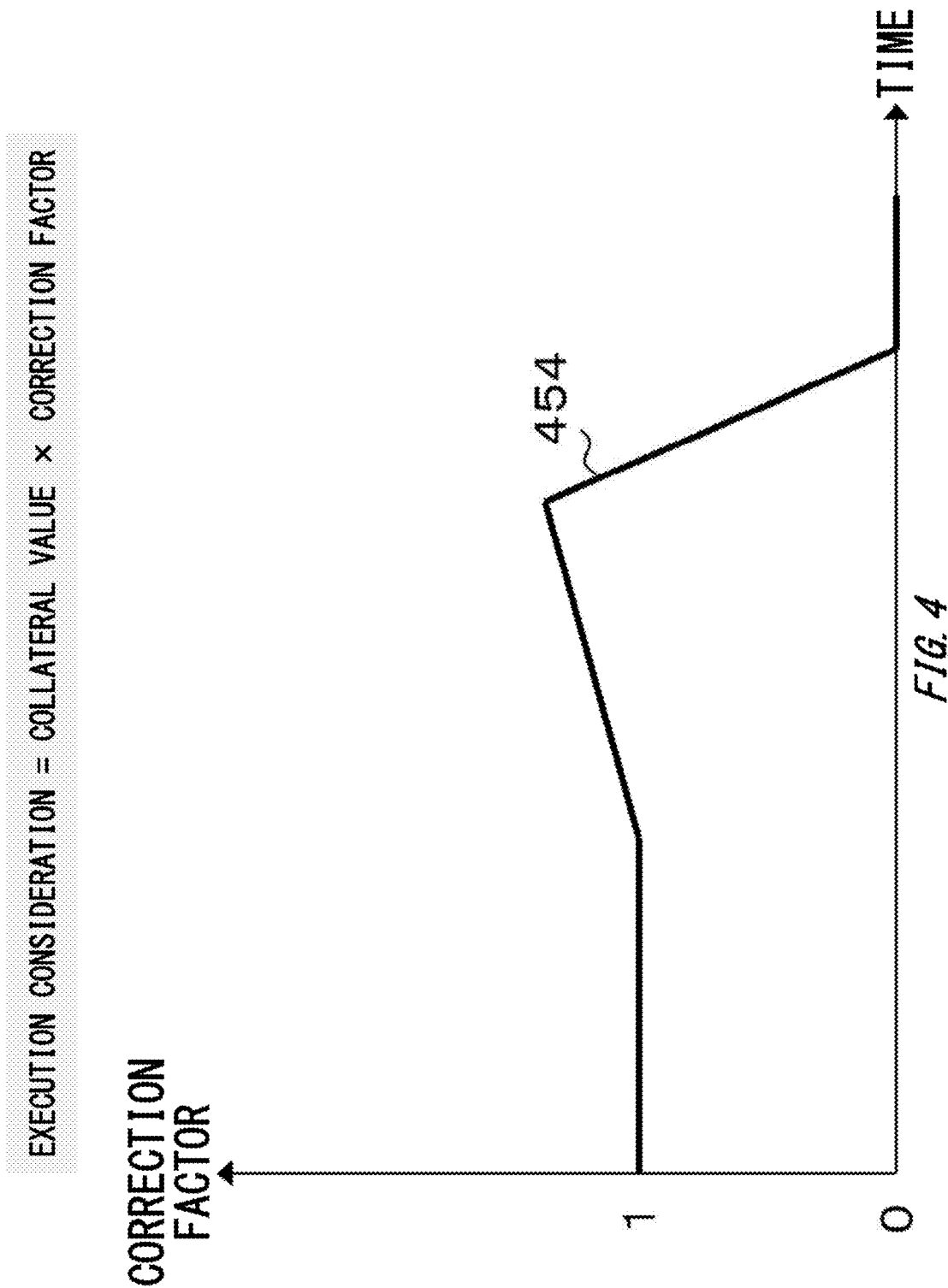
FIG. 4 schematically illustrates one example of the calculation method of the execution consideration.
Figure 5:
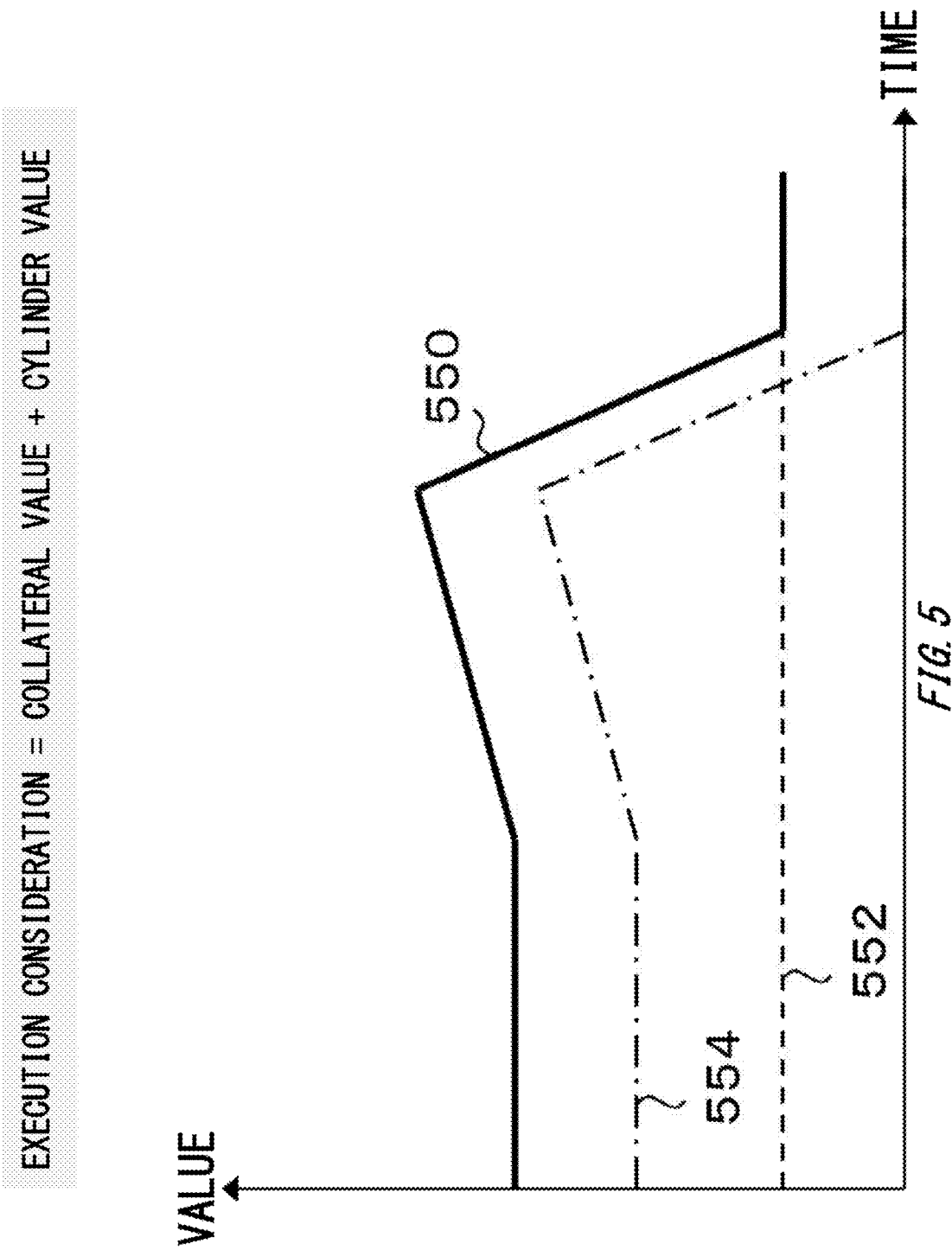
FIG. 5 schematically illustrates one example of the calculation method of the execution consideration.

FIG. 3, FIG. 4, and FIG. 5 schematically illustrate one example of a calculation method of an execution consideration. FIG. 3 schematically illustrates one example of a correction amount 354 when the consideration for the reassignment or return of the hydrogen cylinder 132 at the timing at which the transaction 14 is executed is calculated as a total of the price of the deposit 134 provided due to the transaction 12 and the correction amount 354 calculated by a predetermined procedure. As illustrated in FIG. 3, according to the present embodiment, the correction amount 354 fluctuates over time in the period from the transaction 12 to the transaction 14.

FIG. 4 schematically illustrates one example of a correction factor 454 when the consideration for the reassignment or return of the hydrogen cylinder 132 at the timing at which the transaction 14 is executed is calculated as a product obtained by multiplying the price of the deposit 134 provided due to the transaction 12 by the correction factor 454 calculated by a predetermined procedure. As illustrated in FIG. 4, according to the present embodiment, the correction factor 454 fluctuates over time in the period from the transaction 12 to the transaction 14.

FIG. 5 schematically illustrates one example of a consideration 550, a deposit 552, and an appraisal amount 554 when the consideration 550 for the reassignment or return of the hydrogen cylinder 132 at the timing at which the transaction 14 is executed is calculated as a total of the price of the deposit 552 provided due to the transaction 12 and the appraisal amount 554 of the hydrogen cylinder 132 at the timing at which the transaction 14 is executed. As illustrated in FIG. 4, according to the present embodiment, the appraisal amount 554 of the hydrogen cylinder 132 fluctuates over time in the period from the transaction 12 to the transaction 14.

Figure 6:
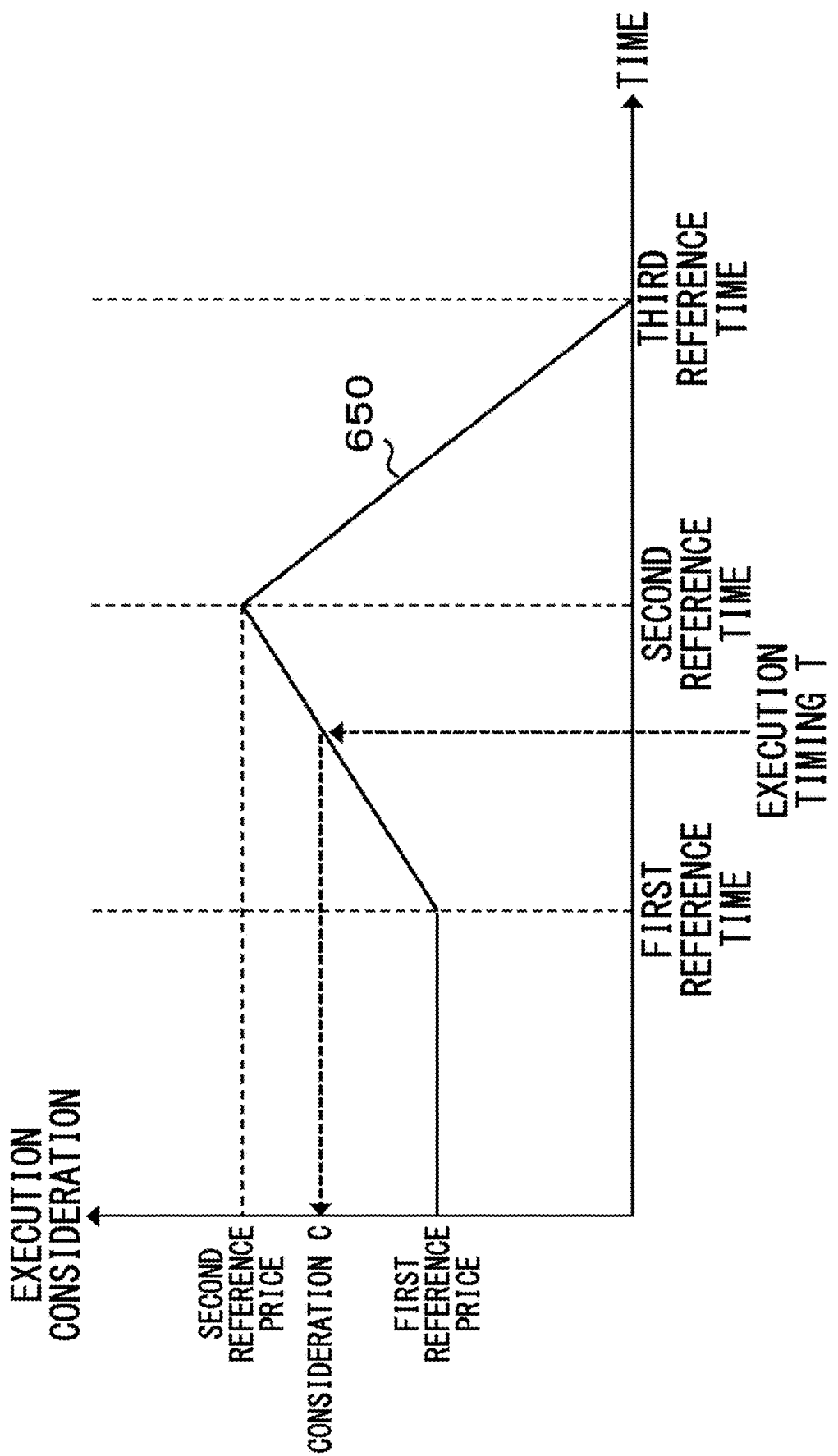
FIG. 6 schematically illustrates one example of a reference to calculate the execution consideration.
Figure 7:
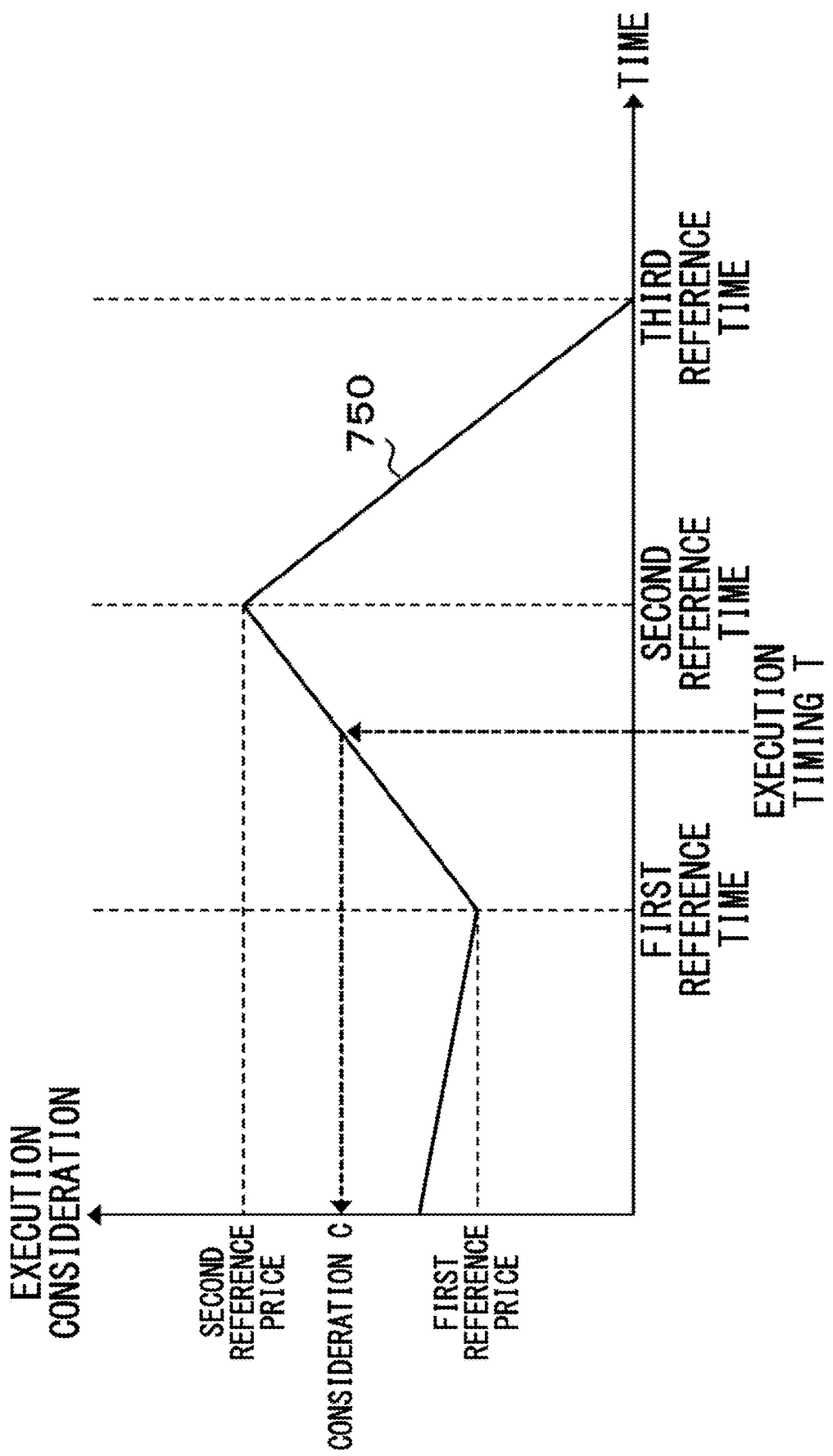
FIG. 7 schematically illustrates one example of the reference to calculate the execution consideration.

FIG. 6 and FIG. 7 schematically illustrate one example of the reference for calculating the consideration for the reassignment or return of the hydrogen cylinder. In FIG. 6 and FIG. 7, an origin of a time axis indicates a timing at which the transaction 12 is executed. In FIG. 6 and FIG. 7, a horizontal axis indicates an elapsed time since the transaction 12 is executed. In FIG. 6 and FIG. 7, a vertical axis indicates a magnitude of the value of the execution consideration. In FIG. 6 and FIG. 7, an execution timing T indicates a timing at which the transaction 14 is executed. In In FIG. 6 and FIG. 7, a consideration C indicates a consideration at the execution timing T.

In FIG. 6 and FIG. 7, a first reference time indicates an elapsed time since the transaction 12 is executed or a timing at which the deterioration state of the hydrogen cylinder 132 satisfies a predetermined condition X. A second reference time indicates an elapsed time since the transaction 12 is executed or a timing at which the deterioration state of the hydrogen cylinder 132 satisfies a predetermined condition Y. A third reference time indicates an elapsed time since the transaction 12 is executed or a timing at which the deterioration state of the hydrogen cylinder 132 satisfies a predetermined condition Z. The condition X, the condition Y, and the condition Z may be mutually different conditions.

In accordance with a reference 650 described in association with FIG. 6, it is indicated that the execution consideration is the first reference price until the elapsed time since the transaction 12 is executed reaches the first reference time. The first reference price may be value larger than 0. In accordance with a reference 650, it is indicated that the execution consideration is higher than the first reference price while the elapsed time since the transaction 12 is executed is between the first reference time and the second reference time. In addition, the execution consideration monotonically increases due to the increase of the elapsed time while the elapsed time since the transaction 12 is executed is between the first reference time and the second reference time. Then, the execution consideration turns to the second reference price when the elapsed time since the transaction 12 is executed reaches the second reference time.

In accordance with a reference 650, it is indicated that the execution consideration is lower than the second reference price while the elapsed time since the transaction 12 is executed is between the second reference time and the third reference time. In addition, the execution consideration monotonically decreases due to the increase of the elapsed time while the elapsed time since the transaction 12 is executed is between the second reference time and the third reference time. Then, the execution consideration is 0 when the elapsed time since the transaction 12 is executed reaches the third reference time. In addition, in accordance with a reference 650, it is indicated that the execution consideration is 0 after the elapsed time since the transaction 12 is executed passes the third reference time.

According to the present embodiment, the execution consideration increases until the execution timing T passes beyond the first reference time and reaches the second reference time. For this reason, for the purchaser 114, more execution consideration is obtained by carefully using the hydrogen cylinder for a long period until the second reference time has arrived. In addition, for the seller 112, an increase of trusted customers using the hydrogen cylinder for a long period is expected. It is noted that a part of sales costs of hydrogen or a part of a subsidy from a country or a local authority may also be credited to a fund of the execution consideration. Furthermore, according to the present embodiment, when the execution timing T passes beyond the second reference time, the execution consideration increases. For this reason, a probability that the hydrogen cylinder is to be collected increases around the second reference time.

In accordance with a reference 750 described in association with FIG. 7, the execution consideration monotonically decreases due to the increase of the elapsed time until the elapsed time since the transaction 12 is executed reaches the first reference time. Then, when the elapsed time since the transaction 12 is executed reaches the first reference time, the execution consideration turns to the first reference price. The first reference price may be a value higher than 0. In accordance with a reference 750, it is indicated that the execution consideration is higher than the first reference price while the elapsed time since the transaction 12 is executed is between the first reference time and the second reference time. In addition, the execution consideration monotonically increases due to the increase of the elapsed time while the elapsed time since the transaction 12 is executed is between the first reference time and the second reference time. Then, the execution consideration turns to the second reference price when the elapsed time since the transaction 12 is executed reaches the second reference time.

In accordance with a reference 750, it is indicated that the execution consideration is lower than the second reference price while the elapsed time since the transaction 12 is executed is between the second reference time and the third reference time. In addition, the execution consideration monotonically decreases due to the increase of the elapsed time while the elapsed time since the transaction 12 is executed is between the second reference time and the third reference time. Then, the execution consideration turns to 0 when the elapsed time since the transaction 12 is executed reaches the third reference time. In accordance with a reference 750, it is indicated that the execution consideration is 0 when the elapsed time since the transaction 12 is executed passes beyond the third reference time.

According to the present embodiment, the execution consideration decreases until the execution timing T reaches the first reference time. On the other hand, the execution consideration increases until the execution timing T passes beyond the first reference time and reaches the second reference time. For this reason, as compared with the embodiment in associated with FIG. 6, it is expected that the hydrogen cylinder is more carefully uses. As a result, a probability that the hydrogen cylinder is used up to around the second reference time increases.

While the present invention has been described by way of the embodiments, the technical scope of the present invention is not limited to the scope described according to the above-described embodiments. It is apparent to persons skilled in the art that various alterations and improvements can be added to the above-described embodiments. An item described according to a particular embodiment can be applied to another embodiment within a range without being technically conflicted. It is also apparent from the descriptions of the claims that the embodiments added with such alterations or improvements may be included in the technical scope of the present invention.

It is noted that the operations, procedures, steps, and stages of each process performed by an apparatus, system, program, and method illustrated in the claims, embodiments, or diagrams may be realized in any order as long as the execution order is not indicated by "prior to," "before," or the like and as long as the output from a previous process is not used in a later process. Even if the operation flow is described using phrases such as "first" or "next" in the claims, embodiments, or diagrams for convenience, it does not necessarily mean that the process must be performed in this order.

EXPLANATION OF REFERENCES 10 communication network, 12 transaction, 14 transaction, 16 transaction, 100 equipment management system, 110 equipment management server, 112 seller, 114 purchaser, 122 communication terminal, 124 communication terminal, 130 fuel cell vehicle, 132 hydrogen cylinder, 134 deposit, 142 consideration, 152 hydrogen cylinder, 154 deposit, 220 input and output control unit, 232 transaction information obtaining unit, 234 cylinder information obtaining unit, 236 event information obtaining unit, 242 use period calculation unit, 244 state determination unit, 246 evaluation unit, 250 execution consideration decision unit, 260 storage unit, 262 equipment information storage unit, 264 reference information storage unit, 354 correction amount, 454 correction factor, 550 consideration, 552 deposit, 554 appraisal amount, 650 reference, 750 reference

What is claimed is:

1. A management method to manage a portable energy storage equipment using a computer, the management method comprising:

deciding, by the computer, when the portable energy storage equipment transferred from one body to another body as a first transfer at a first timing is transferred from the another body or still another body which is different from the another body to the one body as a second transfer at a second timing, a consideration for the second transfer of the portable energy storage equipment at the second timing based on at least one of (i) a length of a period from the first timing to the second timing and (ii) the deterioration state of the portable energy storage equipment at the second timing;

detecting, by the computer, a generation of an event related to the portable energy storage equipment;

storing contents of the event detected in a storage device; and providing access to the consideration for the second transfer of the portable energy storage equipment at the second timing for at least one of the one body, the another body, and the still another body, wherein the deciding of the consideration includes:

deciding, by the computer, the consideration at the second timing based on at least one of the length of the period from the first timing to the second timing and the deterioration state of the portable energy storage equipment at the second timing, and contents of the event detected in the detecting of the event in the period from the first timing to the second timing.

2. A management method to manage a portable energy storage equipment using a computer, the management method comprising:
- deciding, by the computer, when the portable energy storage equipment transferred from one body to another body as a first transfer at a first timing is transferred from the another body or still another body which is different from the another body to the one body as a second transfer at a second timing, a consideration for the second transfer of the portable energy storage equipment at the second timing based on at least one of (i) a length of a period from the first timing to the second timing and (ii) the deterioration state of the portable energy storage equipment at the second timing;
- obtaining deterioration information indicating the deterioration state of the portable energy storage equipment at the second timing;
- storing the deterioration information in a storage device; and
- providing access to the consideration for the second transfer of the portable energy storage equipment at the second timing for at least one of the one body, the another body, and the still another body, wherein
- the deciding of the consideration includes, when the second timing satisfies a predetermined first condition, deciding, by the computer, the consideration such that the consideration at the second timing is further increased (i) as the period from the first timing to the second timing is longer, or (ii) as deterioration of the portable energy storage equipment, as indicated by the deterioration state of the portable energy storage equipment, further progresses.

* * * * *